United States Patent [19]

Mettetal

[11] 4,300,785
[45] Nov. 17, 1981

[54] ANTI-JACKKNIFING DEVICE

[75] Inventor: Bert J. Mettetal, Tecumseh, Mich.

[73] Assignee: Truck Safety Systems, Inc., Tecumseh, Mich.

[21] Appl. No.: 55,243

[22] Filed: Jul. 6, 1979

[51] Int. Cl.³ .......................................... B62D 53/06
[52] U.S. Cl. ................................................ 280/432
[58] Field of Search ................ 280/432, 457, 474; 188/71.1, 18 A, 112 R, 112 A, 142

[56] References Cited

U.S. PATENT DOCUMENTS 3,774,941 11/1973 Durr ................................. 280/432
3,883,160 5/1975 Meyers et al. ................... 280/432

Primary Examiner—Joseph F. Peters, Jr.
Assistant Examiner—Randall A. Schrecengost
Attorney, Agent, or Firm—Cullen, Sloman, Cantor, Grauer, Scott & Rutherford

[57] ABSTRACT

A disk brake system is provided for a tractor and trailer combination in order to control articulation between the tractor and trailer. The hydraulically operated disk brake and disk brake housing are operatively secured to the fifth wheel coupling provided on the tractor and are positioned by a disk brake housing receiving structure located on the trailer when the trailer is attached to the tractor. The fifth wheel coupling has a concentric attachment secured thereto on the side opposite the kingpin receiving socket provided therein. The disk brake has an annular disk brake concentric surface which is pivotally attached at its ends to brackets provided on the fifth wheel and which is slidably engaged by the concentric attachment when the tractor and trailer are attached. The disk brake includes pads located on opposite sides of the disk brake concentric surface.

5 Claims, 9 Drawing Figures

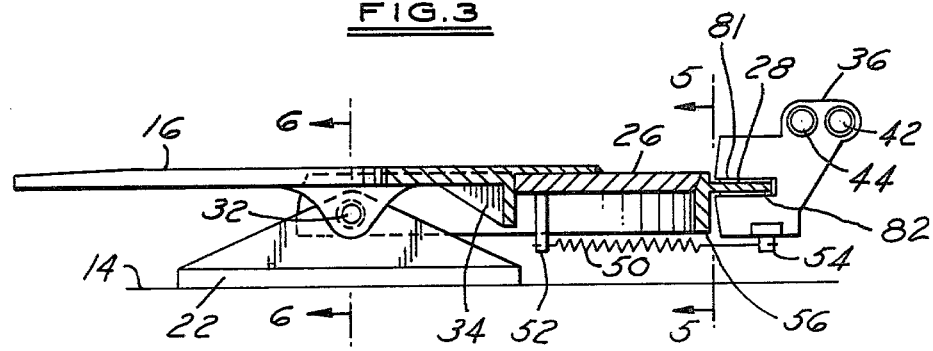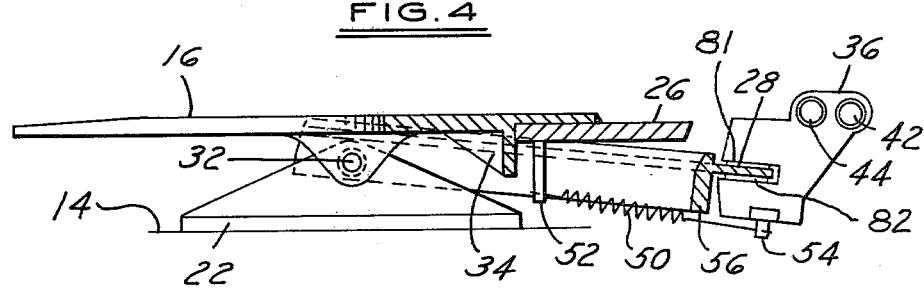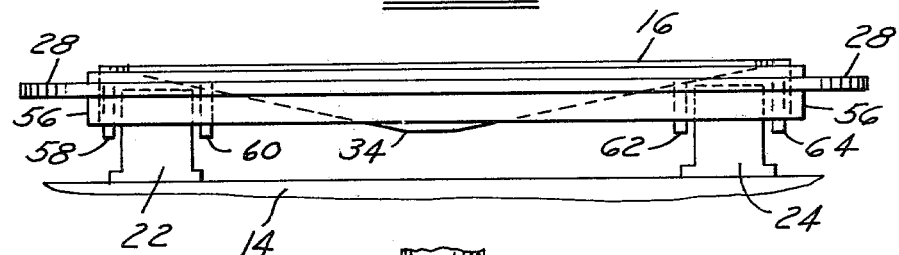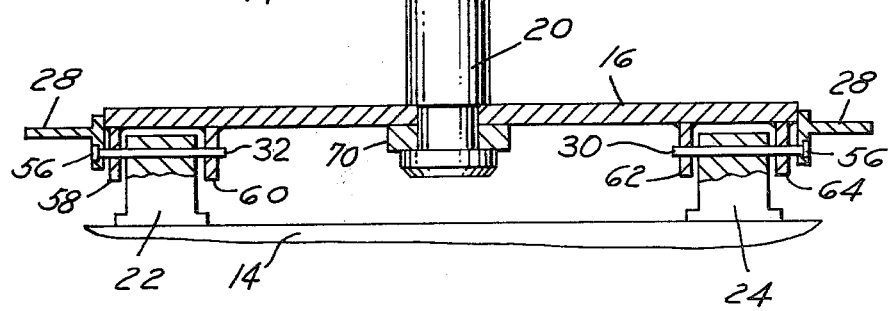

ANTI-JACKKNIFING DEVICE

BACKGROUND OF THE INVENTION

The environment of the present invention is that of articulated vehicles which consist of a load carrying trailer attached to a tractor by a device which is known as a fifth wheel coupling. The tractor comprises a chassis supported by two pairs of coaxial wheels, one pair of which is driven by a prime mover and the other pair being used for steering purposes. The tractor portion of the articulated vehicle is used as a mechanism to which a series of different trailers may be attached and transported. The trailers commonly constitute the prime storage space for products to be shipped or moved.

One of the common drawbacks in the articulated vehicle method of shipping involved the tendency of the trailer portion to "jackknife" during heavy deceleration or on slippery surfaces. This jackknifing occurs whenever the rear road wheels of the tractor portion are locked and skid in a direction transverse to the direction of travel thus causing the trailer portion to swing about the fifth wheel coupling which is used to connect the trailer to the tractor moving portion. Further, the jackknifing may cause the trailer to hit the side of the tractor thereby posing a serious threat to not only the tractor and trailer vehicle but any other traffic on the highway which may come into the path of the uncontrolled articulated vehicle.

The most common type of jackknifing occurs when there is either a difference in the coefficient of friction between the road and the tires of the trailer wheels as opposed to the tractor wheels when each is in a locked and skidding condition or when the front wheels of the tractor do not skid and a side force is applied to the skidding rear wheels of the tractor which causes an imbalance between the direction in which the tractor is proceeding and the trailer which is following it. This imbalance causes uncontrollable jackknifing.

Various proposals have been made for inhibiting or controlling the jackknifing action of articulated vehicle by a braking action between the tractor and trailer, and while some of these systems have been shown to be acceptable in use as discussed, for example, in the Hayes et al U.S. Pat. No. 3,874,699, they make no provision for controlled articulation after the brake has been applied. That is, the Hayes et al patent provides a brake disk which is secured to a turntable which is mounted on the tractor and which is used to prevent rotation of the turntable when the vehicle is being braked. While this tends to limit the jackknifing effect when the brake calipers are applied, it does not provide any flexibility when the brake is applied. This means that once the brake calipers are applied in order to prevent jackknifing, the tractor and trailer unit must proceed without any further articulation. Therefore, should the driver of the tractor have to negotiate a turn while the brake calipers on the fifth wheel where in operation the entire tractor and trailer unit must proceed in a straight line which if the load in the trailer is heavy enough will surely cause uncontrolled skidding.

Furthermore, the turntable of the Hayes patent adds an additional piece of equipment to be mounted on the tractor frame which, because of the increased thickness, makes it impractical for use with standard U.S. tractor and trailer combinations. In the event that the truck would be modified, the revision would involve a substantial expenditure on the tractor and trailer and as a consequence of that modification, the tractor could not be used with the standard trailers.

The improved anti-jackknifing device of the present invention provides not only a means of preventing jackknifing during braking operations, but also provides a flexibility which allows for controlled articulation between the trailer and the tractor while the disk brake is applied without affecting the ability of the tractor to be used with standard trailers.

SUMMARY OF THE INVENTION

The present invention relates to an improved anti-jackknifing device for attaching a tractor to a trailer wherein the tractor contains a fifth wheel coupling attached to a support means on the frame of the tractor and the improvement comprises an arcuate annular brake surface concentric with the kingpin receiving socket on the tractor and secured to the support on the tractor to provide limited rotation about a horizontal axis and a disk brake member and housing secured to the fifth wheel for positioning along the brake surface. The trailer portion contains a brake housing receiving structure for receiving the brake housing when the trailer kingpin is positioned in the socket on the tractor. This brake housing receiving structure on the trailer provides for limited rotation of the trailer about the vertical axis formed by the kingpin and socket when the brake engages the arcuate annular brake concentric surface.

In the preferred embodiment, the brake housing receiving structure located on the trailer is operatively center biased by hydraulically operated pistons which provide linearly increasing resistance to articulation between the trailer and the tractor when the disk brake is applied. This articulation is limited by the resistance of the hydraulically actuated pistons to 10° on either side of the point on the annular brake surface where the hydraulically operated pads of the disk brake engage opposite sides of the annular brake surface surface. This feature provides for additional controlled articulation no matter at what point on the brake surface the disk brake engages. That is, if the disk brake is engaged at the point when the tractor is negotiating a turn, the trailer may still articulate an additional 10° on either side of that point to provide control even in emergency situations which occur during a turning maneuver.

Another feature of the preferred embodiment is the operative coupling of the disk brake housing to the fifth wheel in order to retain the disk brake housing in contact with the annular brake surface when the trailer is disengaged from the tractor or when a trailer is being used which is not equipped to receive the disk brake housing. Thus, when the disk brake structure is not being used or is not capable of being used because of the trailer construction, the disk brake housing is retained on the brake annular surface and both the housing and the surface gravitationally rotate downward about a horizontal axis in order that the conventional trailer may be attached without any interference from the annular brake surface and the attached disk brake housing.

In order to provide frictional support between the annular brake concentric surface and the fifth wheel structure an arcuate extension is affixed to a conventional fifth wheel which extension is concentric with the kingpin receiving socket.

The annular brake concentric surface makes use of the same limited vertical rotational mechanism as the conventional fifth wheel on the tractor. This is accomplished by replacing the conventional length hinge pins in the fifth wheel rotational coupling with extended hinge pins which hold not only the fifth wheel coupling to the tractor frame but also hold the annular brake concentric surface of the present invention. The improved anit-jackknifing system overcomes the disadvantages of the prior art by providing the driver with controlled articulation of up to 20° through actuation of the hydraulically actuated pistons even after the disk brake engages the fifth wheel. This is important because in the prior art devices once the disk brake engages the fifth wheel coupling, no further articulation could occur between the trailer and tractor. Thus the tractor and trailer system were rigidly locked into whatever angular configuration the tractor made with the trailer when the brake was applied. In contradistinction, the improved anti-jackknifing disk brake system allows for controlled articulation after the disk brake has been applied thereby providing the driver with an assurance that further turning and maneuvering may be accomplished without jeopardizing the stability of the tractor and trailer combination.

Perhaps the most important advantage of the present system is that the driver may apply the brake to the fifth wheel coupling whenever road conditions are wet or slippery which will prevent the wild oscillations which lead to jackknifing and at the same time may negotiate lane changing, stopping and all normal driving maneuvers associated with freeway driving including the on ramp and off ramp turning designed into the interstate highway system. This means that the 20° of freedom built into the receiving structure of the trailer allows a driver to make a normal turn off of an interstate highway or onto an interstate highway without disengaging the fifth wheel coupling brake system which is a vitally important advantage in winter driving or when the roads are otherwise wet or slippery. Likewise, the driver may engage the coupling at any point in his or her maneuvering on the road. That is, if it becomes necessary in the middle of a turn to engage the brake onto the fifth wheel, it may be accomplished immediately without concern for an abrupt halt in the changing of the angle or articulation between the truck and the trailer because of the built-in 20° of additional freedom (10° in each direction).

By using the improved articulation control between the tractor and the trailer inherent in the present disk brake configuration, the driver is assured of safe operation in adverse weather conditions, increased reliability in those same whether conditions and the public is alleviated of much of the fear involved in driving on interstate highways due to the presence of tractor and trailer combinations.

BRIEF DESCRIPTION OF THE DRAWINGS

FIG. 3 is a side view of the fifth wheel and braking system of FIG. 2 as if the tractor and trailer were connected but without showing the trailer, trailer frame or the disk brake housing receiving structure which forms part of the trailer;

FIG. 4 shows the braking system of FIG. 3 when a trailer is not attached to the tractor or when an unmodified trailer is attached to the tractor;

FIG. 5 is a view of the fifth wheel construction and modification taken along lines 5—5 of FIG. 3;

FIG. 6 is a cut-away view taken along lines 6—6 of FIG. 3 showing the kingpin receiving socket;

DETAILED DESCRIPTION

Figure 1:
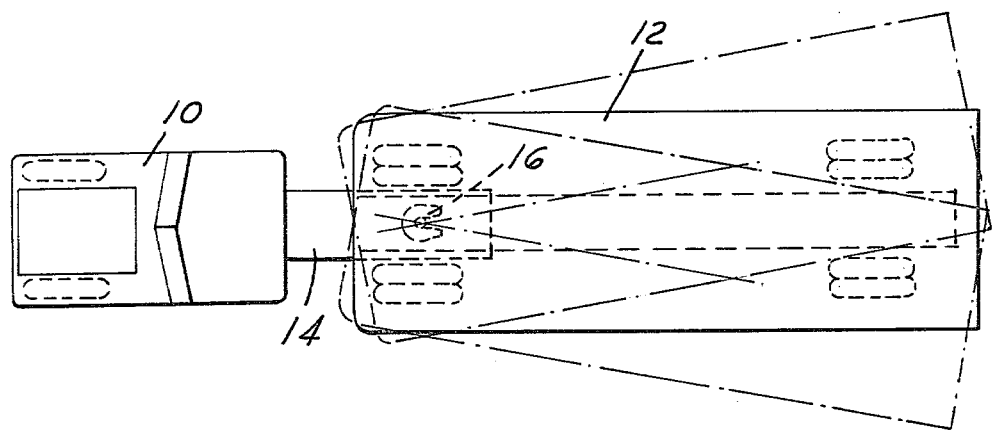
FIG. 1 shows the tractor and the trailer combination with limited controlled articulation shown in phantom.

The basic articulated vehicles used in conjunction with the present invention are shown in FIG. 1 which includes a tractor 10 and a trailer 12 attached to the tractor frame 14 by a conventional fifth wheel 16. The articulation between the tractor 10 and trailer 12 is shown in phantom in FIG. 1.

Figure 2:
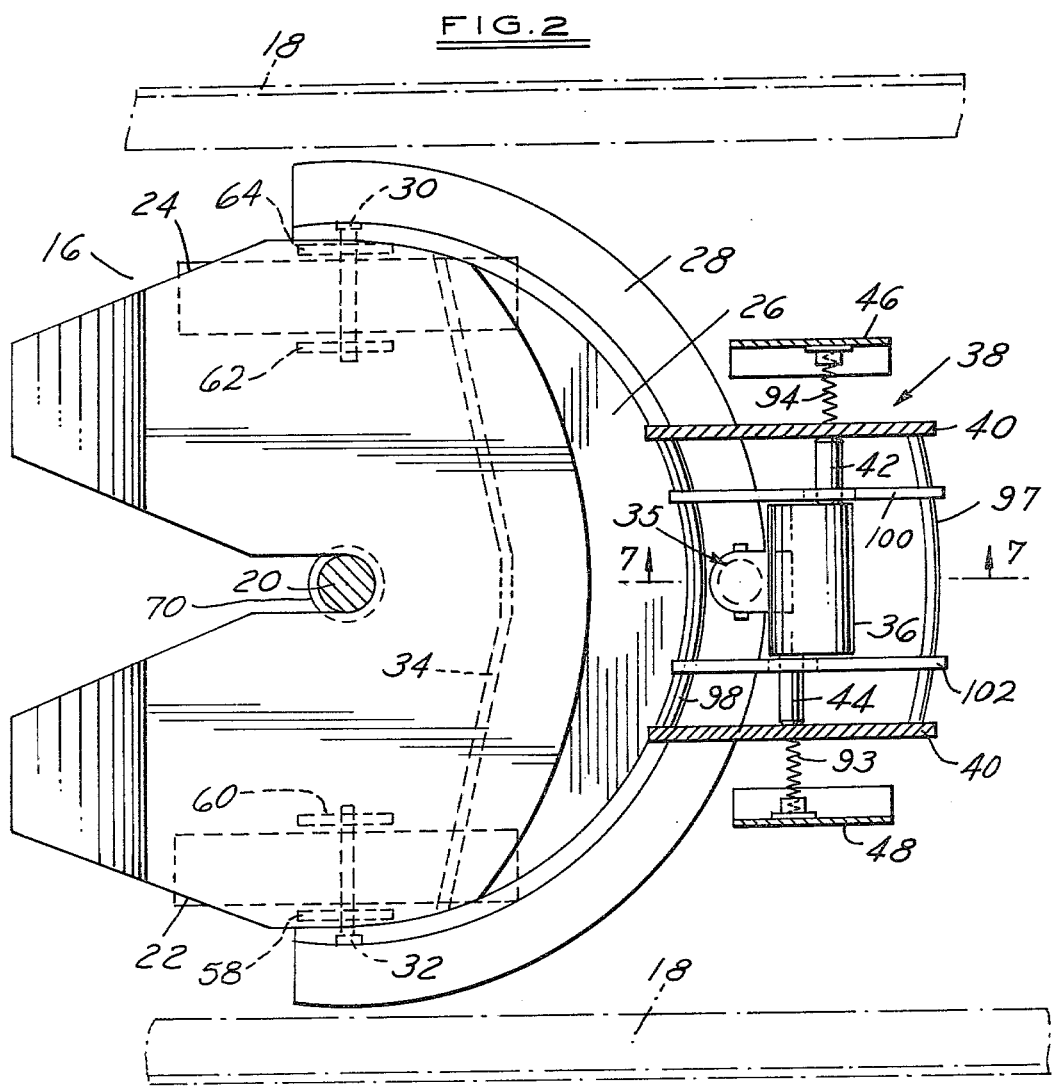
FIG. 2 is a top view of a fifth wheel modified by the present invention to include an annular disk brake concentric surface and a disk brake housing structure including pads carried by the concentric surface.

The fifth wheel modification of the present invention is shown in a top view in FIG. 2 which illustrates the trailer frame 18 as it sets upon the tractor frame 14 and encompasses the fifth wheel 16 supported by trailer frame 14, while showing the kingpin 20 which forms the interconnection between the tractor 10 and the trailer 12. The kingpin 20 is carried by the trailer frame 18. The fifth wheel 16 is attached to the tractor frame 14 by means of two fifth wheel retaining brackets 22 and 24. The fifth wheel 16 is modified by a concentric attachment 26 which slidably engages the annular disk brake concentric surface 28. The disk brake concentric surface 28 is attached to the fifth wheel 16 by means of extended linch pins 30 and 32 from the fifth wheel retaining brakets 22 and 24 which are in turn carried by the tractor frame 14. Shown at 34 is a conventional fifth wheel rotational limiting flange which is used to limit the vertical downward movement of the portion of the fifth wheel 16 nearest the tractor 10. The braking of the present invention is accomplished by a disk brake 35 and housing 36 which act to grab the annular disk brake concentric surface 28. The disk brake housing 36 is located in the disk brake housing receiving structure 38 which receiving structure is part of the trailer 12. The disk brake housing 36 is located within the receiving structure 38 only when the trailer 12 is attached to the tractor frame 14 by the kingpin 20. When the disk brake 35 engages the annular brake surface 28 the rotation which is controlled is that of the trailer 12. This is in contradistinction to most disk brake operations in which the so-called rotor is the object which is prevented from rotation whereas in the present invention, the annular brake surface 28 is fixed in the horizontal plane and the trailer 12 which contains the disk brake housing receiving structure 38 and the disk brake housing 36 is the structure which is limited in rotation. The disk brake housing receiving structure 38 is made up of a receiving structure bracket 40 and main frame sections 97,98 and cross bar 95 as will be further described in connection with FIGS. 7-9. The disk brake housing 36 has a pair of cylinders 37 for the two hydraulically actuated pistons 42 and 44. The housing 36 and pistons 42 and 44 are carried by the annular disk brake concentric surface 28 as shown in FIGS. 3 and 4. The annular disk brake concentric surface 28 is in turn pivotally carried by the pins 30, 32 of the fifth wheel 16. The hydraulically actuated pistons 42 and 44 allow the trailer 12 to affect limited rotation depending upon the pressure within the hydraulically actuated pistons 42 and 44 when the disk brake 35 engages the annular disk brake concentric surface 28. This rotation is approximately limited to 10° on either side of a line connecting the kingpin 20 with the disk brake 35. Although the disk brake 35, the disk brake housing 36, and the disk brake housing receiving structure 38 are shown in FIG. 2 as being approximately in the center of the semi-circular annular concentric brake surface 28, in fact the disk brake 35 may be applied at any point on that brake surface and the affected additional controlled rotation provided to the trailer 12 remains 10° in either direction from the point of the application of the disk brake 35. This means that the driver may be in the middle of a turn when he applies the disk brake 35 and from that point the trailer 12 is allowed to rotate 10° on either side of the point of application. This provides an extremely useful tool available to the driver when he must suddenly apply the disk brake 35 without regard to what position the articulated vehicles 10 and 12 are currently in.

The fifth wheel 16 and its associated concentric attachment 26 as well as the annular disk brake concentric surface 28 and the disk brake housing 36 are shown in a cut-away side view in FIGS. 3 and 4. FIG. 3 shows the disk brake housing 36, which is carried by the concentric surface 28, in its position when the trailer 12 is attached to the tractor 10 by the kingpin 20 whereas FIG. 4 shows the position of the disk brake housing 36 when the trailer 12 is not attached to the tractor 10 or when an unmodified trailer such as any conventional trailer is attached. It can be seen from FIG. 4 that when the disk brake housing 36 of the present invention is not in use the annular brake surface 28 and the associated disk brake housing 36 swing down to the position of FIG. 4 so as not to interfere with the operation of the tractor 10 with a conventional or unmodified trailer. The disk brake housing 36 is attached to the fifth wheel 16 by means of a disk brake housing retaining spring 50 which is connected between a retaining pin 52 located on the fifth wheel concentric attachment 26 and a retaining flange 54 located on the disk brake housing 36.

In order to enhance the structural stability of the annular disk brake 35 and to aid in the engagement of the fifth wheel concentric attachment 26 with the disk brake structure when the disk brake housing 36 is in the position shown in FIG. 3, the disk brake surface 28 has an annular brake surface fifth wheel engagement section 56.

FIG. 5 is a cut-away view of FIG. 3 taken along lines 5—5 showing the fifth wheel 16 and the annular disk brake concentric surface 28 as it is attached to the tractor frame 14 by the fifth wheel retaining brackets 22 and 24. This holding is accomplished by means of two sets of fifth wheel rotation supporting flanges 58, 60, 62 and 64. The engagement of these flanges with the fifth wheel retaining brackets 22 and 24 is by means of the extended linch pins 30 and 32 as best shown in FIG. 6 which is taken along lines 6—6 of FIG. 3. Also shown in FIG. 6 is the annular brake surface and fifth wheel engagement section 56 which is also rotatably held to the retaining brackets 22 and 24 by the extended linch pins 30 and 32. FIG. 6 also details the kingpin 20 and its receiving socket 70.

Figure 7:
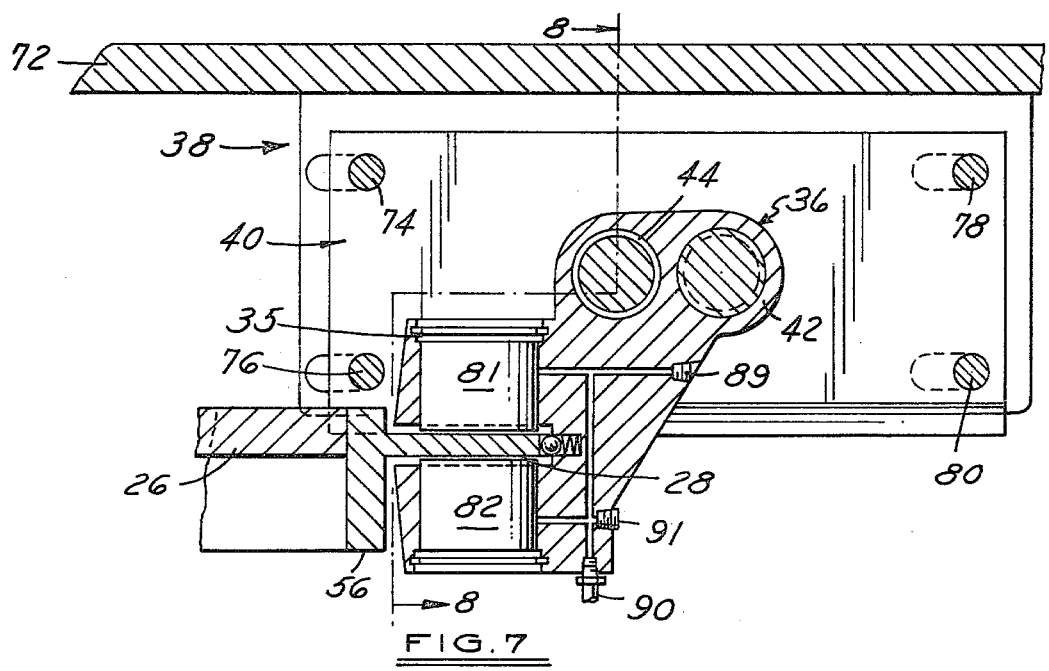
FIG. 7 is a cut-away side view showing the disk brake housing located in the disk brake housing receiving structure of a modified trailer.
Figure 8:
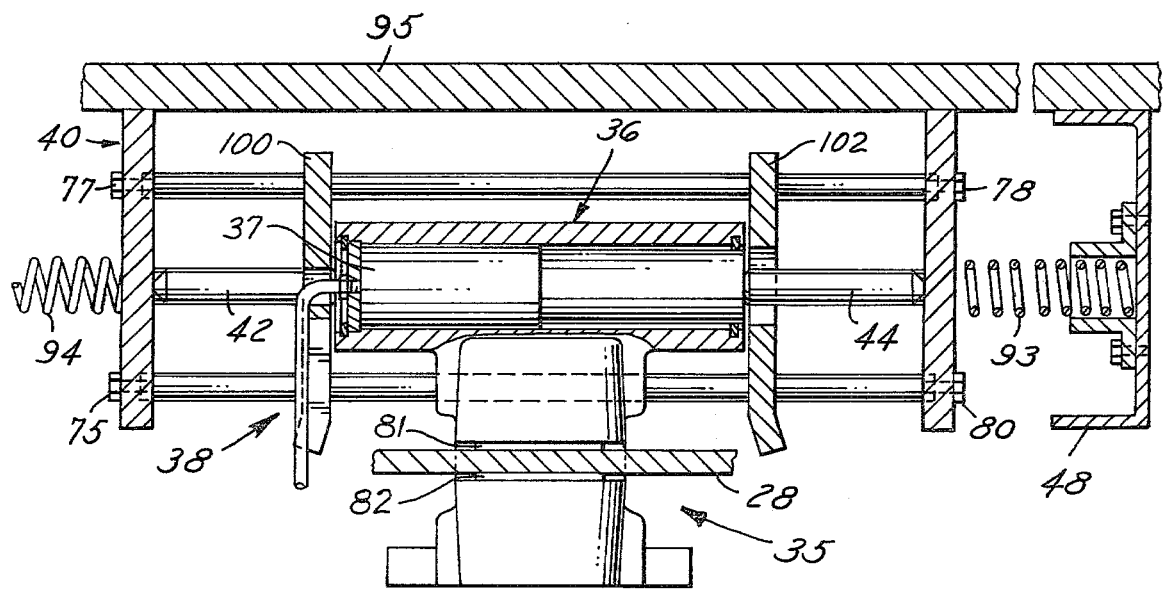
FIG. 8 is a cut-away taken along lines 8—8 of FIG. 7 showing the disk brake housing receiving structure.
Figure 9:
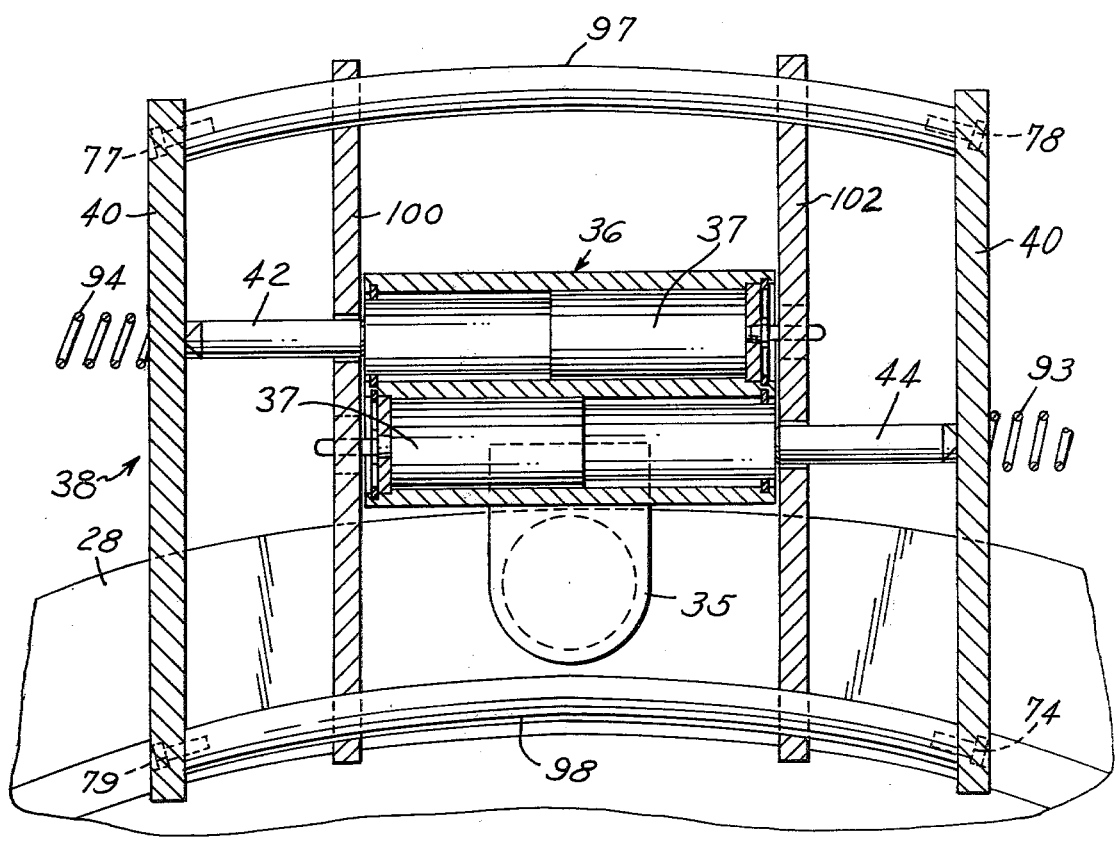
FIG. 9 is a top view of the disk brake housing and receiving structure as well as the annular brake concentric surface.

FIG. 7 shows a cut-away side view of the disk brake housing 36 and receiving structure 38 taken along lines 7-7 of FIG. 2. The disk brake 35 and the disk brake housing 36 is shown nested in the disk brake housing receiving structure 38. The receiving structure 38 and its associated bracket structure 40 as shown in FIG. 2 is held by the frame disk brake housing receiving pins 74, 75, 76, 77, 78, 79, and 80 as seen in FIGS. 7, 8 and 9. The disk brake pads 81 and 82 are shown as being located on either side of the annular disk brake concentric surface 28 and the associated fifth wheel engagement section 56 as well as the stationary fifth wheel concentric attachment 26 previously discussed in conjunction with FIG. 2. Also shown in FIG. 7 are the hydraulic brake operation lines 89, 90, and 91 which are operated from standard hydraulic brake circuits, not shown.

Another view of the receiving structure 38 and the brake housing structure 36 are shown in FIG. 8 which are taken along lines 8—8 of FIG. 7. Aside from showing the hydraulically actuated pistons 42 and 44, the FIGS. 2 and 8 also show the modified trailer frame sections 48, 46 and the associated spring 93 and spring 94 associated with trailer frame sections 48, 46 which resiliently retain the disk brake housing receiving structure 38 in a centered position when the disk brake 35 does not engage the annular brake surface 28. Also shown in FIG. 8 is the trailer crossbar 95 which is part of the bracket structure 40 built into a modified trailer to be used in conjunction with the disk brake system of the invention.

The FIG. 9 shows a cut-away of part of the disk brake 35, the disk brake housing structure 36 and the disk brake receiving structure 38 as previously discussed in conjunction with the FIGS. 3, 7 and 8. As can best be seen from FIGS. 2 and 9, the main frame sections 97 and 98 which slidably contain the subframe sections 100 and 102 are formed so as to be concentric with the kingpin 20 and kingpin receiving socket 70 (FIG. 2) in order to provide effective and symmetrical controlled articulation between the tractor 10 and trailer 12 when the disk brake 35 engages the annular brake surface 28.

Further modifications may be made from the exact detail shown particularly in regard to the construction of the brake housing receiving structure located on the trailer unit and the details of retaining the brake housing surface in contact with the fifth wheel without departing from the spirit and scope of this invention as defined in the claims.

I claim:

1. In an anti-jackknifing device for attaching a tractor vehicle to a trailer to be towed wherein a pair of transversely spaced support brackets are affixed to the rear of said vehicle and a fifth wheel coupling having a trailer kingpin receiving socket is pivotally mounted on said support brackets about a horizontal axis to receive the kingpin provided on the trailer, with the horizontal axis intersecting the vertical axis of the socket and kingpin, the improvement comprising an annular disk brake concentric surface concentric with the vertical axis of said socket, the ends of said annular brake concentric surface being pivotally mounted on said support brackets for limited rotation about said horizontal axis, a hydraulically operated disk brake and disk brake housing carried by said annular disk brake and freely movable thereon when said tractor vehicle and trailer are attached and said disk brake not applied, said disk brake including a pair of brake pads located on opposite sides of said annular disk brake concentric surface, a disk brake housing receiving structure carried by said trailer for receiving said disk brake and said disk brake housing when said trailer kingpin is positioned in said trailer kingpin receiving socket of said vehicle, said tractor vehicle and said trailer with said disk brake not applied permitting relative rotation of said trailer about the vertical axis formed by said kingpin and said kingpin receiving socket, with said disk brake and said disk brake housing moving freely relative to said annular disk brake concentric surface, said brake pads upon application of the hydraulic disk brake gripping the annular disk brake concentric surface; and control means interposed between said disk brake, disk brake housing and said disk brake housing receiving structure for providing controlled articulation between said tractor vehicle and said trailer upon application of said hydraulic brakes and once said brake pads grip said annular disk brake concentric surface.

2. The improved anti-jackknifing device of claim 1 wherein said controlled articulation is approximately 10° on each side of the center line formed by said trailer kingpin receiving socket and said hydraulic disk brake.

3. The improved anti-jackknifing device of claim 1 wherein said disk brake housing has a pair of cylinders provided with hydraulically actuated pistons, said pistons extending outwardly through the opposing end walls of said housing in opposite directions and engageable with the opposing walls of said retaining structure.

4. The improved anti-jackknifing device of claim 2 wherein the amount of said controlled articulation is limited in one direction by the engagement of one end wall of said disk housing with the opposing wall of said disk brake housing receiving structure and the amount of said controlled articulation is limited in the other direction by the engagement of the other end wall of said disk brake housing with the opposing wall of said disk brake housing receiving structure.

5. The improved anti-jackknifing device of claim 1 wherein resilient means are interposed between said disk brake housing and said fifth wheel to rotate said annular disk brake concentric surface and the disk brake housing carried thereby about said horizontal axis out of the plane of said fifth wheel when said disk brake housing of said tractor vehicle is not in engagement with said trailer.

* * * * *